United States Patent
Brazas et al.

(10) Patent No.: US 10,344,883 B2
(45) Date of Patent: Jul. 9, 2019

(54) MODULAR ELECTRO-MECHANICAL ROTARY VALVE

(71) Applicant: Schaeffler Technologies AG & Co. KG, Herzogenaurach (DE)

(72) Inventors: Peter Brazas, Royal Oak, MI (US); Tracy Novinski, Macomb Township, MI (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 15/341,622

(22) Filed: Nov. 2, 2016

(65) Prior Publication Data
US 2018/0119838 A1   May 3, 2018

(51) Int. Cl.

| | | |
|---|---|---|
| *F16K 27/06* | (2006.01) | |
| *F01P 7/02* | (2006.01) | |
| *F01P 7/14* | (2006.01) | |
| *F16K 11/087* | (2006.01) | |
| *F16K 27/00* | (2006.01) | |
| *F16K 31/04* | (2006.01) | |
| *F16K 31/53* | (2006.01) | |
| *F01P 7/16* | (2006.01) | |

(52) U.S. Cl.
CPC .............. *F16K 27/067* (2013.01); *F01P 7/02* (2013.01); *F01P 7/14* (2013.01); *F01P 7/16* (2013.01); *F16K 11/0876* (2013.01); *F16K 27/003* (2013.01); *F16K 31/043* (2013.01); *F16K 31/535* (2013.01); *F01P 2007/146* (2013.01)

(58) Field of Classification Search
CPC .............. F16K 27/067; F16K 31/535; F01P 2007/146; F01P 7/14
See application file for complete search history.

(56) References Cited

U.S. PATENT DOCUMENTS

| | | | | |
|---|---|---|---|---|
| 3,591,131 A | * | 7/1971 | Carlson ................. | B61D 5/008 137/797 |
| 3,894,559 A | * | 7/1975 | DePuy ................ | F16K 11/0873 137/595 |
| 4,809,949 A | * | 3/1989 | Rakieski ................ | F16K 5/061 137/382 |
| 4,921,598 A | * | 5/1990 | Desch ...................... | C02F 1/42 137/599.15 |
| 5,031,876 A | * | 7/1991 | Giacomini ............ | F16K 5/0647 251/312 |

(Continued)

*Primary Examiner* — Matthew W Jellett
*Assistant Examiner* — Christopher D Ballman
(74) *Attorney, Agent, or Firm* — Matthew V. Evans (57) ABSTRACT

A modular electro-mechanical rotary valve (EMRV) designed to be installed and removed as a unit is provided. The modular EMRV includes a valve enclosure, at least one rotary valve body with at least one fluid pathway, and an actuator assembly. The valve enclosure, removably disposed within a mating cavity, includes a central axis, at least one inlet, at least one outlet, a hollow center, and at least one exterior seal interface to sealingly engage with at least one interior seal interface of the mating cavity. The at least one rotary valve body is disposed within the hollow center of the valve enclosure. The actuator assembly is engaged with an actuator interface of the at least one rotary valve body, providing rotational actuation. Various angular positions of the at least one rotary valve body are possible to manage fluid flow within a fluid system.

20 Claims, 11 Drawing Sheets

(56) References Cited

U.S. PATENT DOCUMENTS

| | | | | | |
|---|---|---|---|---|---|
| 5,269,347 | A | * | 12/1993 | Beasley | F16K 11/163 137/607 |
| 6,197,195 | B1 | * | 3/2001 | Booth | B01D 29/35 137/454.6 |
| 6,358,416 | B1 | * | 3/2002 | Miller | B01D 17/005 137/588 |
| 6,539,899 | B1 | * | 4/2003 | Piccirilli | F01P 7/167 123/41.08 |
| 8,082,947 | B2 | * | 12/2011 | Chang | F16K 5/0647 137/614.01 |
| 8,356,627 | B2 | * | 1/2013 | Hoshi | G01F 1/36 137/557 |
| 8,397,757 | B2 | * | 3/2013 | Kannoo | F16K 11/074 137/625.43 |
| 8,967,199 | B2 | * | 3/2015 | Blieske | F16K 39/06 137/625.21 |
| 9,068,666 | B2 | | 6/2015 | Roby | |
| 2015/0027572 | A1 | | 1/2015 | Morein | |
| 2015/0083057 | A1 | * | 3/2015 | Tsuchiya | F01P 7/14 123/41.08 |
| 2015/0090916 | A1 | * | 4/2015 | Zollinger | F16K 5/0694 251/214 |
| 2015/0159351 | A1 | * | 6/2015 | Smith | E03C 1/025 251/129.11 |
| 2016/0281585 | A1 | * | 9/2016 | Muizelaar | F01P 7/14 |

\* cited by examiner

MODULAR ELECTRO-MECHANICAL ROTARY VALVE

TECHNICAL FIELD

Example aspects described herein relate to electro-mechanical rotary valves for use within fluid cooling systems of vehicular powertrains.

BACKGROUND

As fuel economy becomes paramount in the transportation industry, efforts have increased to achieve higher internal combustion (IC) engine efficiencies and to seek alternative powertrains. Coolant valves are well known and can be arranged to provide coolant flow control for temperature management of various powertrain components including internal combustion engines, transmissions and various components of hybrid electric and fuel cell vehicles.

A portion of coolant valves are electro-mechanical in design, incorporating an actuator assembly that interfaces with a mechanical rotary valve body to provide a controlled flow of coolant to a selected powertrain component or system. An electric motor, controlled by the engine control unit, is often employed within the actuator assembly of the electro-mechanical rotary valve (EMRV) to achieve any desired angular position of the rotary valve body. A transmission or gear train can be utilized between the electric motor and rotary valve body. An injection molded plastic outer housing is typically used for an EMRV that is often mounted directly on either a cylinder head or cylinder block of the IC engine. The use of plastic provides a light-weight solution to fulfill complex outer housing design specifications that are required for mounting and sealing the EMRV to the engine, providing connections for hoses, and guiding and sealing the internal rotary valve. The outer housing must be able to withstand the rigors of a vibrating IC engine, which include large temperature fluctuations and exposure to dust, water, and salt. Additionally, all of the fasteners for either mounting or sealing of the hoses must be accessible within a crowded IC engine compartment.

Due to these design requirements and rigorous environment, the outer housing is often one of the higher priced components of the EMRV and also contributes to many failure modes that could occur. Amongst all of the components of the EMRV, the outer housing typically requires the most time and effort to achieve a production-worthy design. A new design for an EMRV is needed that addresses these shortcomings while maintaining critical functions for current and future applications.

SUMMARY OF THE INVENTION

A modular electro-mechanical rotary valve (EMRV) is provided that eliminates a traditional outer housing and instead utilizes a mating cavity integrated within a powertrain component or any other receiving structure. "Modular" describes the scalability, flexibility, and simplicity of the modular EMRV that can easily be installed and removed as a unit within the mating cavity, which reduces packaging space and component cost while increasing robustness and serviceability.

The modular EMRV includes a valve enclosure, at least one rotary valve body, and an actuator assembly. The valve enclosure includes a central axis, at least one inlet, at least one outlet, a hollow center, and at least one exterior seal interface. The at least one exterior seal interface sealingly engages with at least one interior seal interface arranged within the mating cavity. At least one seal may be present between the at least one exterior seal interface and the at least one interior seal interface. The at least one rotary valve body includes at least one fluid pathway, a central axis, and an actuator interface. The actuator assembly can be located at a first end and the at least one outlet can be located at a second end of the valve enclosure. The at least one inlet can be radially arranged on the valve enclosure. The at least one rotary valve body is disposed within the hollow center of the valve enclosure. To facilitate a reduced packaging space, the central axis of the valve enclosure can be offset from a central axis of the at least one rotary valve body.

The actuator assembly includes an actuator that rotationally actuates the at least one rotary valve body to achieve any desired angular or rotational position. Continuously variable angular positions of the at least one rotary valve body are possible to manage the fluid flows and subsequent temperatures of a fluid-cooled system. For the modular EMRV with one inlet and one rotary valve body having one fluid pathway, a first rotational position of the rotary valve body can provide full fluid flow from the inlet to the outlet; a second rotational position can prevent fluid flow from the inlet to the outlet; and, an intermediate position can throttle the flow from the inlet to the outlet. A gear train can be arranged between the actuator and rotary valve body. A drive shaft can also be arranged between the gear train and rotary valve body, with a first end of the drive shaft engaged with the gear train and a second end engaged with the rotary valve body.

The mating cavity for the modular EMRV can be configured within but not limited to a powertrain component such as an internal combustion engine (for example, a cylinder head, engine block or front cover), transmission, or differential. The mating cavity can extend inwardly or protrude outwardly from an outer wall of the powertrain component or any other receiving structure. The mating cavity serves as a fluid terminal for intersecting fluid flow paths that interface with the valve enclosure of the modular EMRV; the flow of fluid within each of these fluid flow paths is managed by an angular or rotational position of the at least one rotary valve body disposed within the valve enclosure. Both the valve enclosure and mating cavity can be cylindrical in shape.

BRIEF DESCRIPTION OF DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

FIGS. 9A-12B are cross-sectional views taken from FIG. 6 showing different rotary valve body rotational positions.

DETAILED DESCRIPTION OF THE EMBODIMENTS

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left" and "right" designate directions in the drawings to which reference is made. The terminology includes the words specifically noted above, derivatives thereof, and words of similar import.

Figure 16:
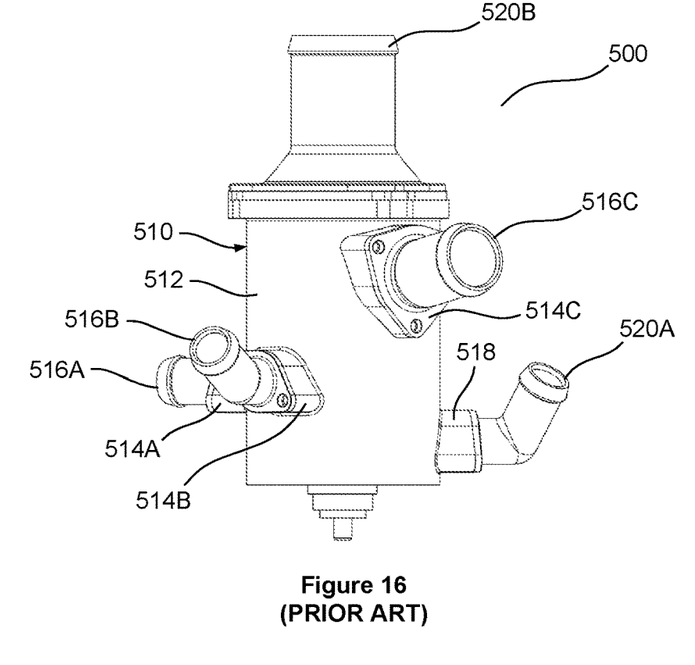
FIG. 16 is side view of a first prior art EMRV.

Referring to FIG. 16, a portion of a first prior art electro-mechanical rotary valve (EMRV) 500 is shown that includes an outer housing assembly 510 having a first inlet flange 514A, a second inlet flange 514B, a third inlet flange 514C, and an outlet flange 518, all radially arranged on a cylindrical outer housing 512. Separate first, second, and third inlet pipe components 516A-516C and an outlet pipe component 520A are attached to their respective flanges 514A-514C,518. An additional outlet pipe component 520B is attached to an end of the outer housing 510. Hoses (not shown) extend from each of the inlet and outlet pipe components to various cooling system destinations to complete an engine cooling circuit.

Figure 17:
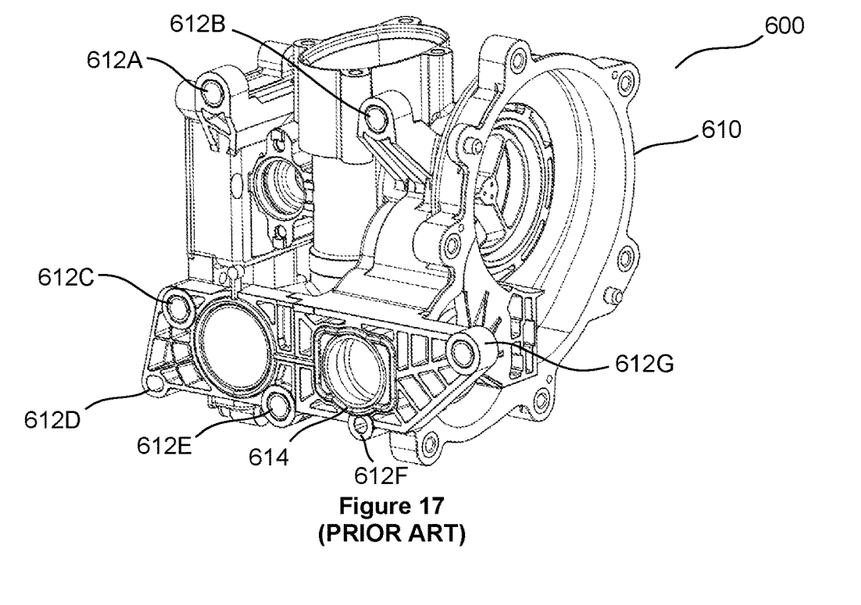
FIG. 17 is an isometric view of a second prior art EMRV.

Now referring to FIG. 17, a portion of a second prior art EMRV 600 is shown with an outer housing 610 configured with mounting features 612A-612G that attach the EMRV 600 to a mounting base of a powertrain component (for example, an IC engine, transmission or differential) or any other receiving structure. The outer housing 610 is also configured with an external seal interface 614 to ensure that leakage does not occur between the EMRV 600 and the component or mounting surface upon which it is mounted. The outer housing 610 is typically injection-molded out of an expensive plastic material that can withstand extreme temperature fluctuations, and exposure to ethylene glycol or engine coolant in a vibrating and corrosive environment. The complexity of the outer housing 610 is significant, and therefore the design of the injection mold tooling is complex and requires significant development time and cost to incorporate many diverse exterior features while also providing interior features that require tight tolerances. Additionally, the packaging space required for the thermal management valve assembly 600 and its corresponding hoses is significant. A new design for an EMRV is needed that reduces the complexity and cost of the outer housing while lowering the packaging space.

Figure 1:
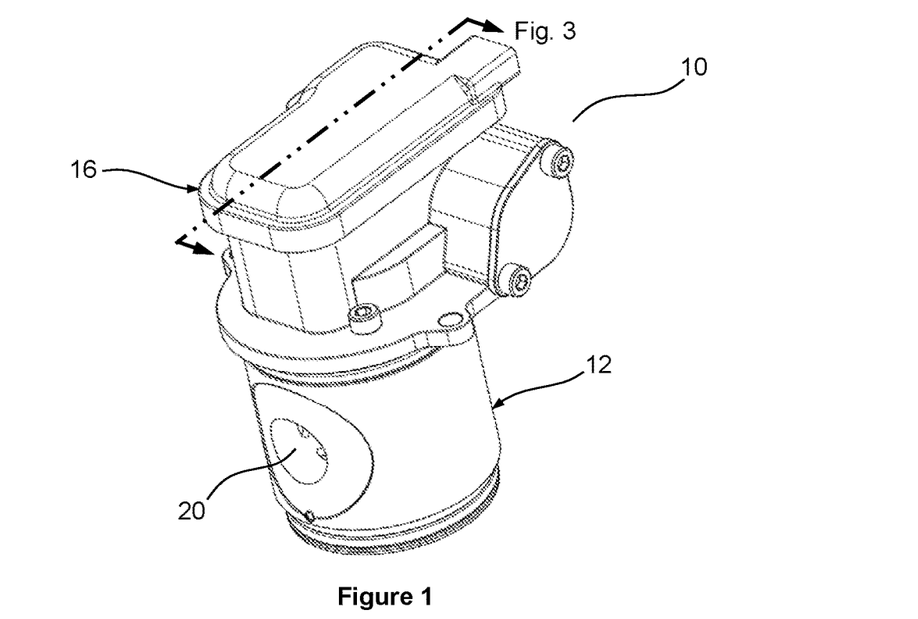
FIG. 1 is a perspective view of an example embodiment of a modular electro-mechanical rotary valve (EMRV).
Figure 2:
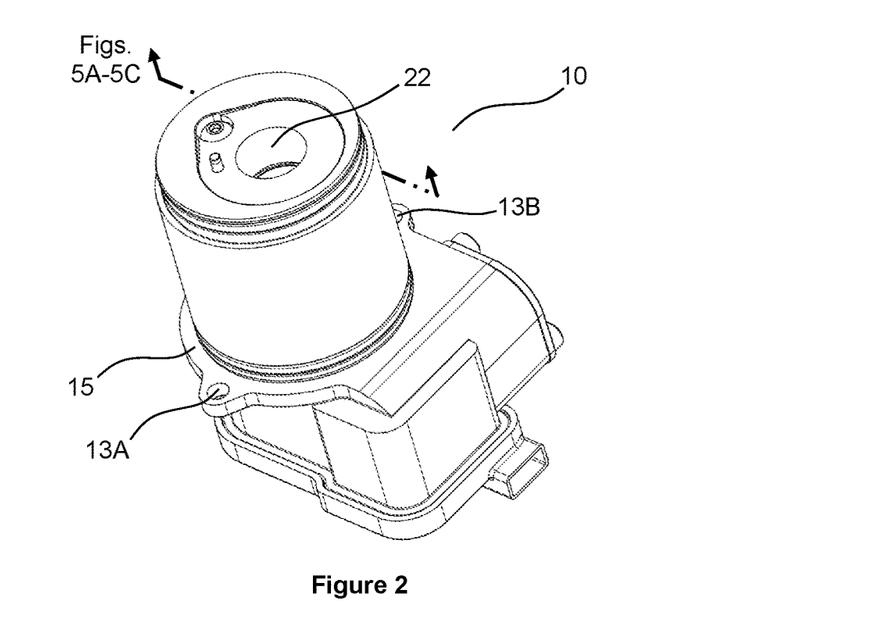
FIG. 2 is another perspective view of the modular EMRV of FIG. 1.
Figure 3:
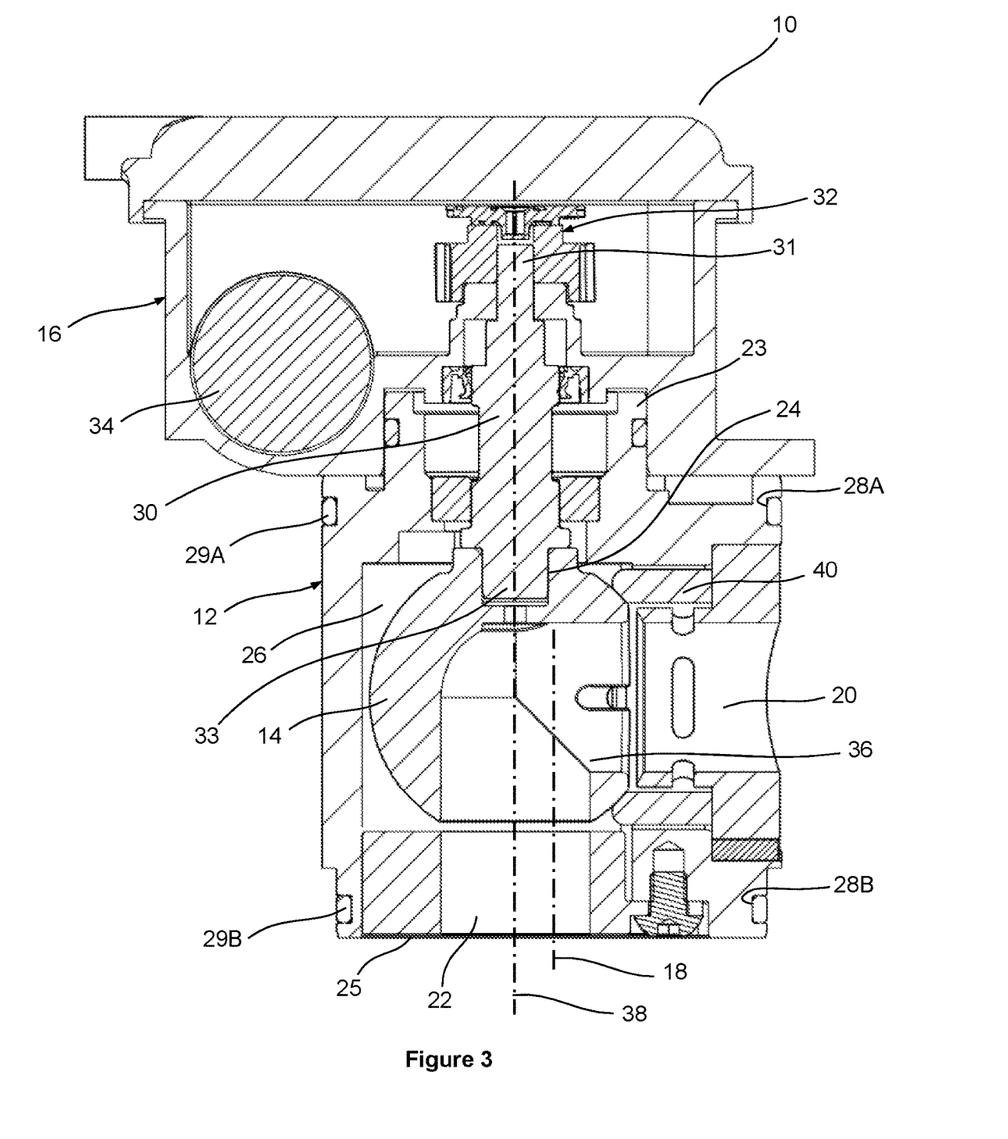
FIG. 3 is a cross-sectional view taken from FIG. 1.
Figure 4:
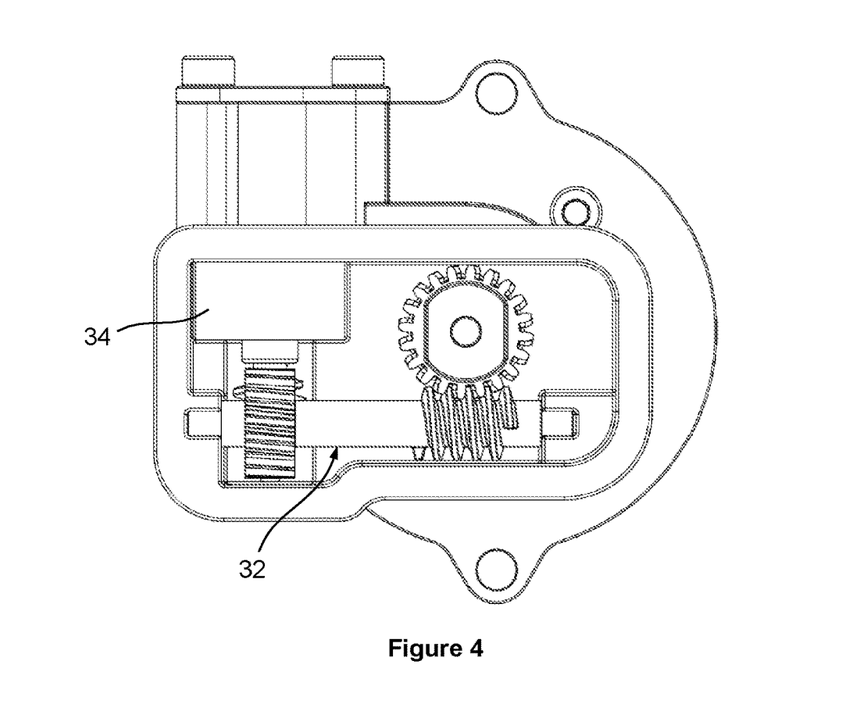
FIG. 4 is a top view of the actuator assembly (with cover removed) for the modular EMRV of FIG. 1.

Now referring to FIGS. 1 through 4, an example embodiment of a modular EMRV 10 is shown that provides a simplified design that eliminates the use of a traditional outer housing. The modular EMRV 10 includes a valve enclosure 12, a rotary valve body 14, and an actuator assembly 16. The valve enclosure 12 includes a central axis 18, an inlet 20, an outlet 22, a hollow center 26, and a first and a second exterior seal interface 28A,28B arranged on the valve enclosure 12. Optional first and second seals 29A,29B can be arranged on the valve enclosure 12 to engage first and second exterior seal interfaces 28A,28B. Seal interface designs other than what is shown, including but not limited to partially circumferential seal interfaces, are also possible. The inlet 20 is radially arranged on the valve enclosure 12. Various circumferential locations of the inlet 20 are possible within the first and second seal interfaces 28A,28B. The actuator assembly 16 is arranged at a first end 23 of the valve enclosure 12 and the outlet 22 is arranged at a second end 25 of the valve enclosure 12. The actuator assembly 16 includes an actuator in the form of an electric motor 34, a gear train 32, and a drive shaft 30; other forms of actuators can also be utilized. The rotary valve body 14, actuated by the actuator assembly 16, is disposed within the hollow center 26 of the valve enclosure 12 and includes a fluid pathway 36, an actuator interface 24, and a central axis 38. Rotary motion of the electric motor 34 is transferred to the rotary valve body 14 by the gear train 32 and the drive shaft 30. A first end 31 of the drive shaft 30 engages the gear train 32, and a second end 33 of the drive shaft 30 engages the actuator interface 24 of the rotary valve body 14. Those skilled in the art of EMRVs are aware that other forms of actuator assemblies are possible such as those that eliminate use of the gear train 32 and/or the drive shaft 30. As shown in FIG. 3, the central axis 18 of the valve enclosure 12 is offset from the central axis 38 of the rotary valve body 14. This non-concentricity between the rotary valve body 14 and the valve enclosure 12 provides ample radial packaging space for a rotary valve inlet seal 40, while minimizing the outer diameter of the valve enclosure 12.

Figure 13A:
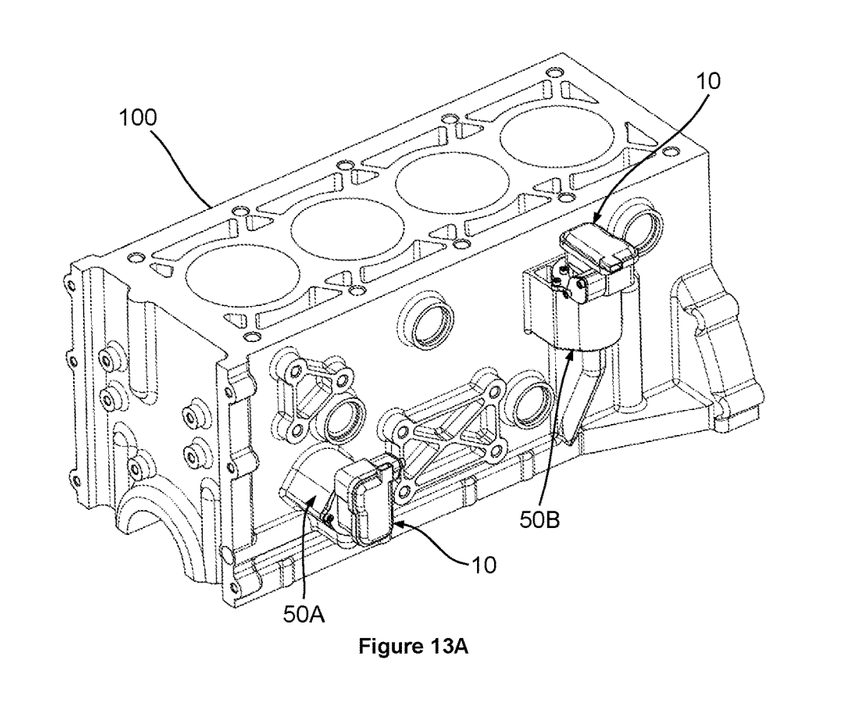
FIG. 13A is a perspective view of the modular EMRV of FIG. 1 applied to multiple locations of an engine block of an internal combustion engine.
Figure 13B:
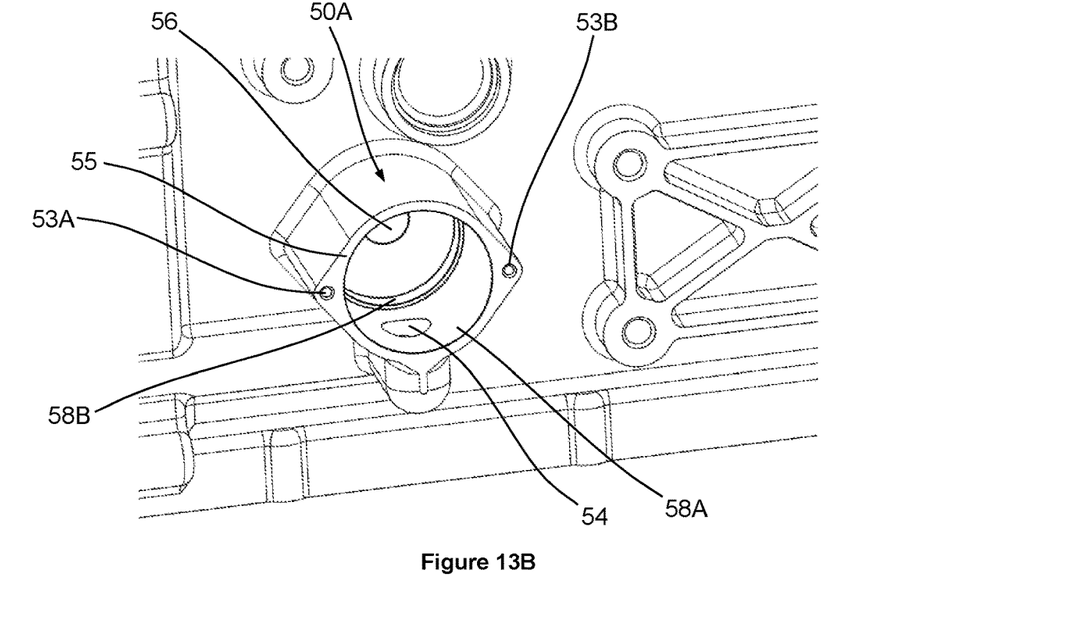
FIG. 13B is a perspective view of the mating cavity for the modular EMRV of FIG. 1.

FIGS. 13A through 15B show different structural applications of how a single or multiple modular EMRVs 10 can be applied to various applications. Two modular EMRVs 10 are shown in FIG. 13A, each placed within a first and a second mating cavity 50A,50B arranged on an engine block 100 of an internal combustion engine. The first mating cavity 50A, hereafter referred to as "the mating cavity 50A", serves as a fluid terminal for at least two intersecting fluid flow paths, with the modular EMRV 10 regulating the amount of fluid flow. The mating cavity 50A can be formed on or within the engine block 100 by current state-of-the-art casting and machining methods. Installation of the modular EMRV 10 requires insertion of the valve enclosure 12 within the mating cavity 50A until an abutment surface 15 of the actuator assembly 16 engages a mounting surface 55. At this position, first and second exterior seal interfaces 28A,28B of the valve enclosure 12 sealingly engage the third and fourth interior seal interfaces 58A,58B of the mating cavity 50A. First and second seals 29A,29B may be present, as shown, between the first and second exterior seal interfaces 28A, 28B and the respective third and fourth interior seal interfaces 58A,58B. Within the figures, the valve enclosure 12 is configured to house the optional first and second seals 29A,29B, however, the mating cavity 50A could also be configured to house the first and second seals 29A,29B. As shown in FIG. 13B, the fourth interior seal interface 58B is radially offset from the third interior seal interface 58A for ease of installation; however, other seal interface designs could also be incorporated. First and second attachment apertures 13A,13B arranged on the actuator assembly 16 are aligned with first and second reception apertures 53A,53B to facilitate an appropriate rotational position and attachment of the modular EMRV 10 by fasteners (not shown); other means of attachment are also possible. In this rotational position, an inlet flow passage 54 of the mating cavity 50A is aligned with the inlet 20 of the valve enclosure 12 and the outlet flow passage 56 of the mating cavity 50A is aligned with the outlet 22 of the valve enclosure 12. While the mating cavity 50A is shown as a cylinder, any suitable form is possible to receive the valve enclosure 12 of the modular EMRV 10.

The arrangement shown in FIG. 13A exemplifies the versatility of the modular EMRV 10, having a capability to be placed in multiple locations in various orientations according to packaging and functional specifications of an application. With the modular EMRV 10, locations can be selected to manage localized cooling zones, as opposed to selecting a single location that necessitates a larger and more complex rotary valve assembly to manage all of the controlled coolant passages that are routed to and from that location. Additionally, the modular EMRV 10 and mating cavity 50A arrangement can reduce the number of hoses for external routing of coolant passages, as some coolant passages can be internally routed to the mating cavity 50A. The reduction of the quantity of coolant hoses yields multiple benefits including weight and packaging reduction, reduced potential for leaks, and improved cooling system response times due to a reduced amount of coolant volume within the system.

Figure 14:
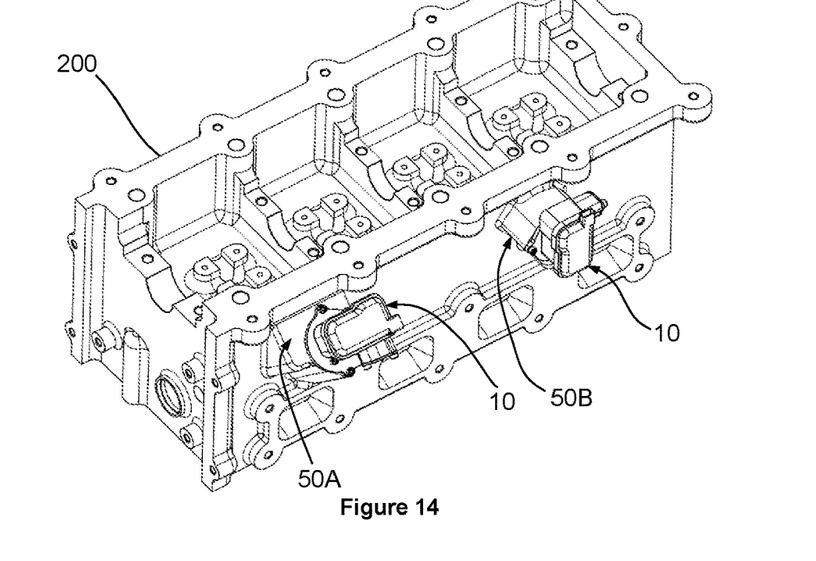
FIG. 14 is a perspective view of the modular EMRV of FIG. 1 applied to multiple locations of a cylinder head of an internal combustion engine.
Figure 15A:
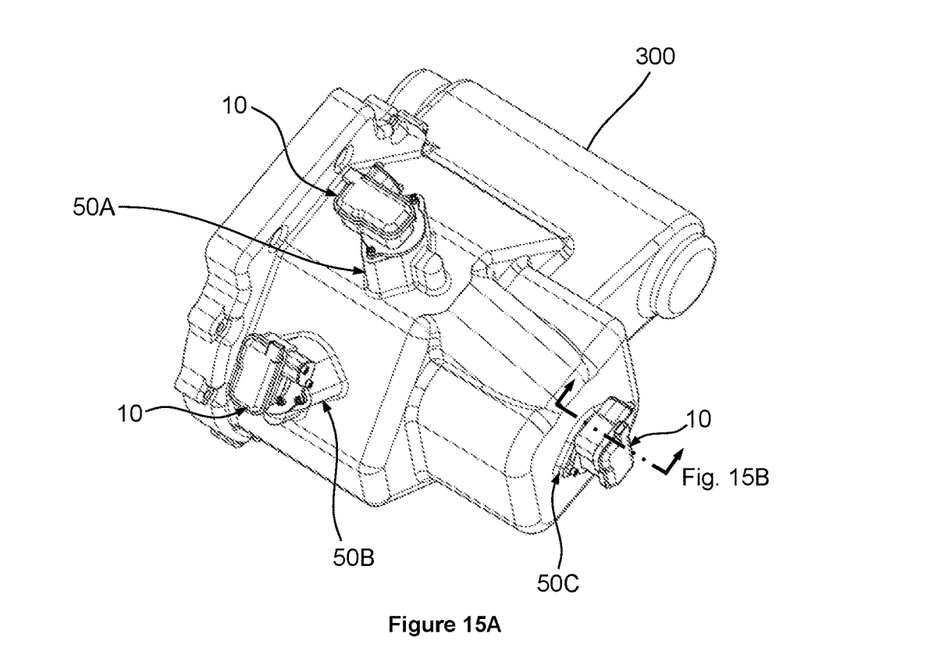
FIG. 15A is a perspective view of the modular EMRV of FIG. 1 applied to a multiple locations of a transmission housing.
Figure 15B:
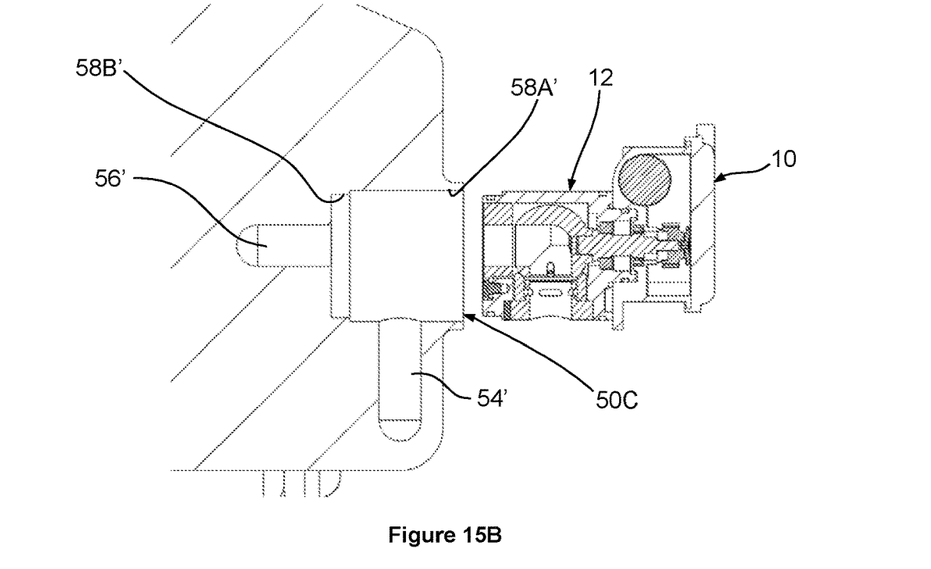
FIG. 15B is a cross-sectional view taken from FIG. 15A.

FIGS. 14 and 15A show additional arrangements of modular EMRVs 10 within a cylinder head 200 of an internal combustion engine and a transmission 300 of a vehicle, respectively. FIG. 15A shows a third mating cavity 50C that extends inside of the transmission 300, as opposed to earlier described designs in FIGS. 13A and 14 where the mating cavity protrudes outwardly from an outer wall of the engine block 100 and cylinder head 200, respectively. A cross-sectional view shown in FIG. 15B shows further details of the third mating cavity 50C that includes an inlet flow passage 54' and an outlet flow passage 56'. Third and fourth interior seal interfaces 58A',58B' are present to seal the valve enclosure 12 within the third mating cavity 50C.

Figure 5A:
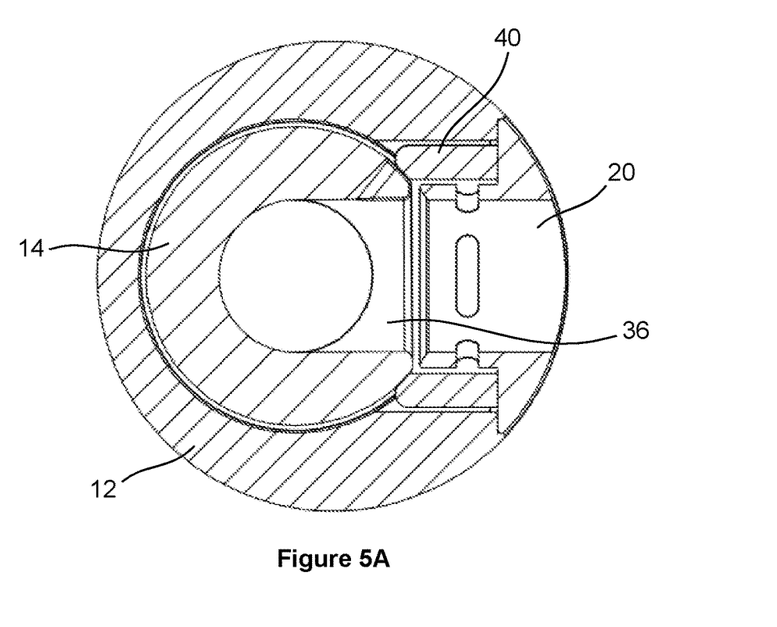
FIGS. 5A-5C are cross-sectional views taken from FIG. 2 showing different rotary valve body rotational positions.
Figure 5B:
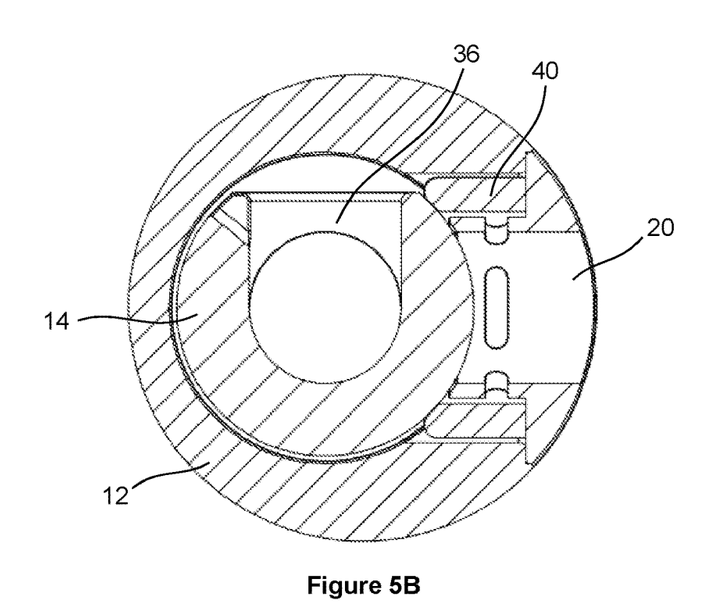
Figure 5C:
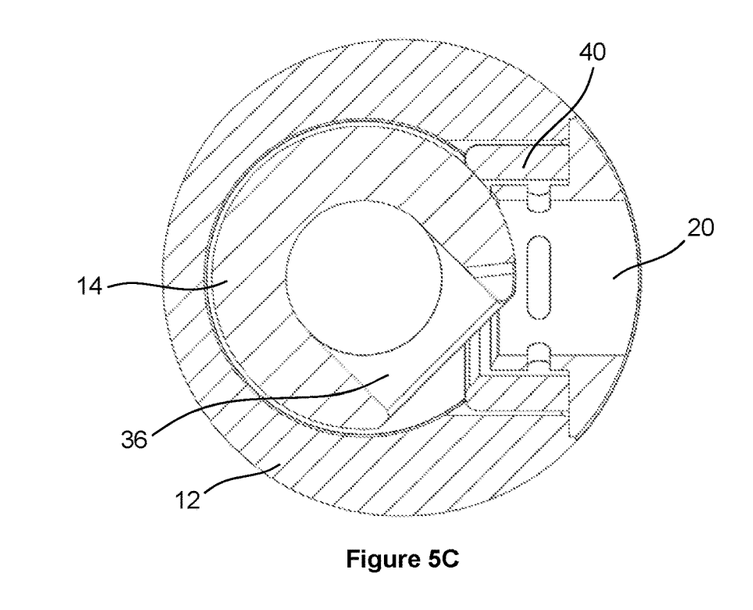
Figure 6:
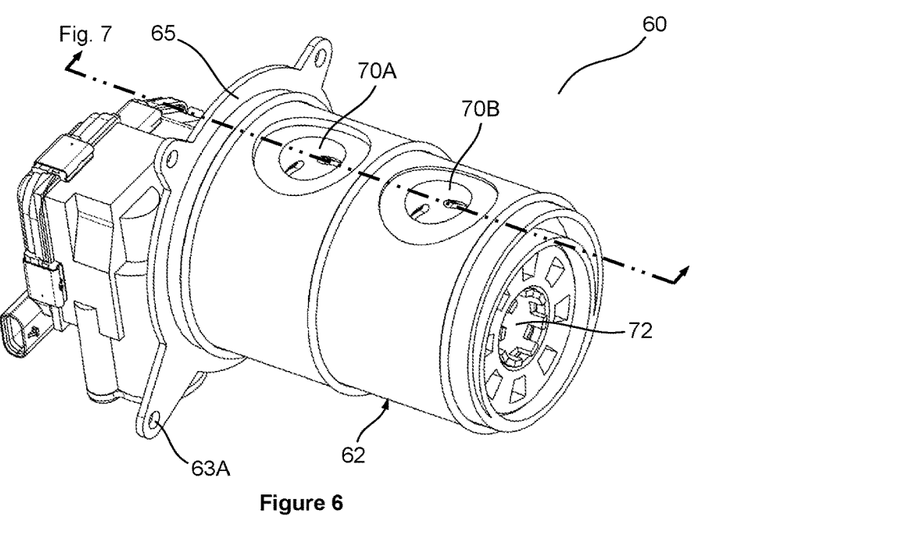
FIG. 6 is a perspective view of another example embodiment of a modular EMRV.

Referring to FIGS. 5A through 5C, with view to FIGS. 1 and 2, three rotational positions of the rotary valve body 14, a small sample of many positions that are possible, are shown that result in different fluid flows from the inlet 20 to the outlet 22. FIG. 5A shows a first rotational position of the rotary valve body 14 that allows full fluid flow from the inlet 20 to the outlet 22. In the first rotational position, the fluid pathway 36 of the rotary valve body 14 is aligned with the inlet 20 of the valve enclosure 12. FIG. 5B shows a second rotational position of the rotary valve body 14 that prevents fluid flow from the inlet 20 to the outlet 22. In the second rotational position, no portion of the fluid pathway 36 of the rotary valve body 14 is in communication with the inlet 20, therefore, no fluid flow occurs from the inlet 20 to the outlet 22. FIG. 5C shows an intermediate rotational position of the rotary valve body 14 that throttles fluid flow from the inlet 20 to the outlet 22. In the intermediate rotational position, a portion of the fluid pathway 36 of the rotary valve body is in communication with the inlet 20 which facilitates a throttling effect on fluid flow from the inlet 20 to the outlet 22.

Now referring to FIGS. 6 through 12B, another example embodiment of a modular EMRV 60 and a mating cavity 90 are shown, along with various rotational positions to achieve different flow states. The modular EMRV 60 includes a valve enclosure 62, a rotary valve body 64, and an actuator assembly 66. The valve enclosure 62 includes a first inlet 70A, a second inlet 70B, an outlet 72, a central axis 82, and a hollow center 76. The first and second inlets 70A,70B are radially arranged on the valve enclosure 62, while the outlet 72 is arranged on a second end 71 of the valve enclosure 62. One skilled in the art of EMRVs would understand that it would also be possible to switch the location of the outlet with one of the inlets such that the outlet is radially arranged on the valve enclosure 62 and either the first or second inlet 70A,70B is arranged on the second end 71 of the valve enclosure 62.

Figure 7:
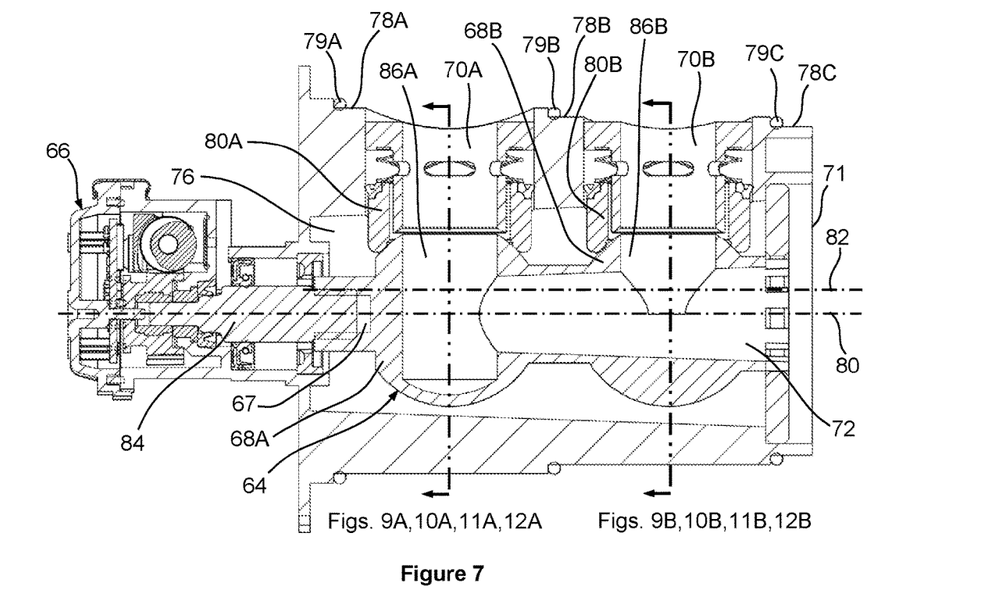
FIG. 7 is a cross-sectional view taken from FIG. 6.

Sealing of the valve enclosure 62 with the mating cavity 90 is accomplished by a first exterior seal interface 78A arranged between the actuator assembly 66 and the first inlet 70A; a second exterior seal interface 78B arranged between the first and second inlets 70A,70B; and, a third exterior seal interface 78C arranged between the second inlet 70B and the second end 71 of the valve enclosure 62. First, second and third seals 79A-79C are optional and can be arranged on the valve enclosure 12 to engage first, second and third exterior seal interfaces 78A-78C. The rotary valve body 64, attached to a drive shaft 84, includes a first portion 68A with a first fluid pathway 86A, a second portion 68B with a second fluid pathway 86B, an actuator interface 67, and a central axis 80. Alternatively, the rotary valve body 64 could be split into two separate bodies that are attached to the drive shaft in series, with each body having a single fluid pathway, similar to the rotary valve body 14 shown in FIG. 3. As shown in FIG. 7, the central axis 82 of the valve enclosure 62 is offset from the central axis 80 of the rotary valve body 64. This offset provides ample radial packaging space for first and second inlet seals 80A,80B of the first and second inlets 70A,70B, while avoiding a larger outer diameter requirement of the valve enclosure 62.

Figure 8:
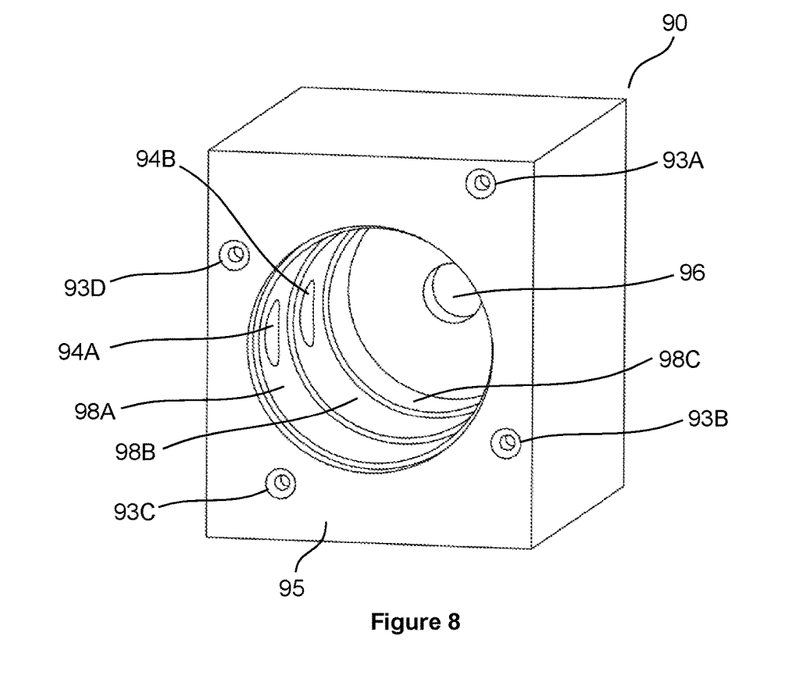
FIG. 8 is a perspective view of the mating cavity for the modular EMRV of FIG. 6.

The mating cavity 90 serves as a fluid terminal for three intersecting fluid flow paths that extend to and from the mating cavity 90, with the modular EMRV 60 regulating the amount of fluid flow. While the mating cavity 90 is shown as a cylinder, any suitable form is possible. Installation of the modular EMRV 60 requires insertion of the valve enclosure 62 within the mating cavity 90 until an abutment surface 65 of the actuator assembly 66 engages a mounting surface 95. At this position, first, second, and third exterior seal interfaces 78A-78C of the valve enclosure 62 sealingly engage with the fourth, fifth and sixth interior seal interfaces 98A-98C of the mating cavity 90. Optional first, second, and third seals 79A-79C can be arranged between the exterior seal interfaces 78A-78C and respective interior seal interfaces 98A-98C. This sealing arrangement provides for sealing isolation for each of the first and second inlets 70A,70B, which prevents cross-talk between the two inlets. Seal interface designs other than what is shown, including but not limited to partially circumferential seal interfaces, are also possible that serve the purpose of sealing the valve enclosure 62 and providing sealing isolation for the first and second inlets 70A,70B.

First, second, third, and fourth attachment apertures 63A-63D arranged on the actuator assembly 65 are aligned with first, second, third, and fourth reception apertures 93A-93D to facilitate an appropriate rotational position and attachment of the modular EMRV 60 by fasteners (not shown); other means of attachment are also possible. In this rotational position, the first inlet flow passage 94A of the mating cavity 90 is aligned with the first inlet 70A of the valve enclosure 62, the second inlet flow passage 94B of the mating cavity 90 is aligned with the second inlet 70B of the valve enclosure, and the outlet flow passage 96 of the mating cavity 90 is aligned with the outlet 72 of the valve enclosure 62. One that is skilled in the art of EMRVs would understand that additional inlets could be added to the modular EMRV 60 by merely extending both the valve enclosure 62 and mating cavity 90, and utilizing additional seal interfaces to accommodate the additional inlets.

Figure 9A:
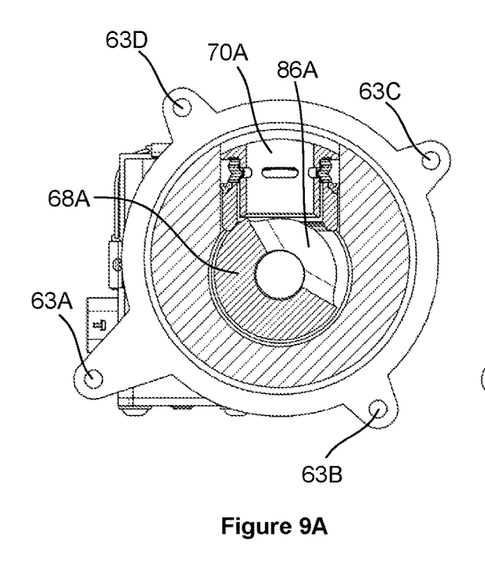
Figure 9B:
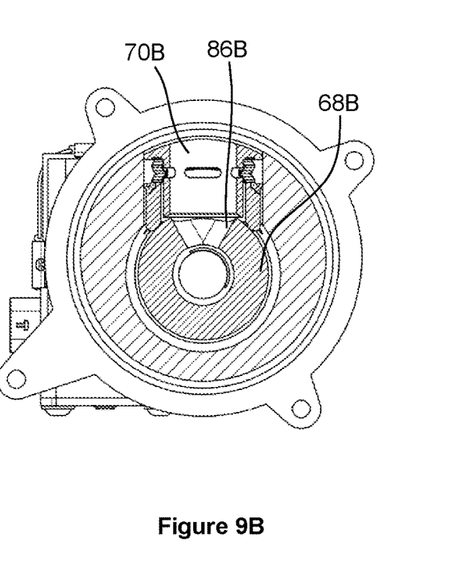
Figure 10A:
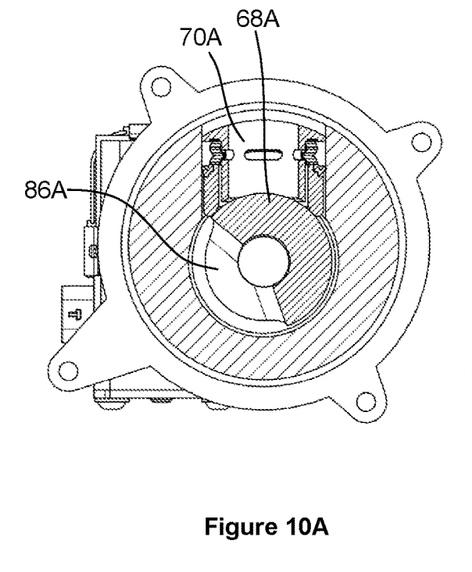
Figure 10B:
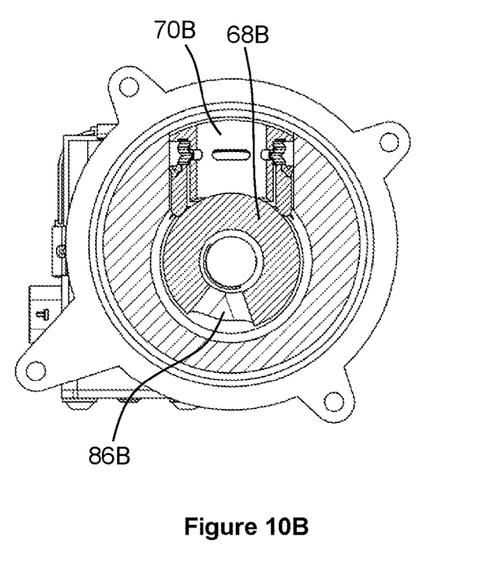
Figure 11A:
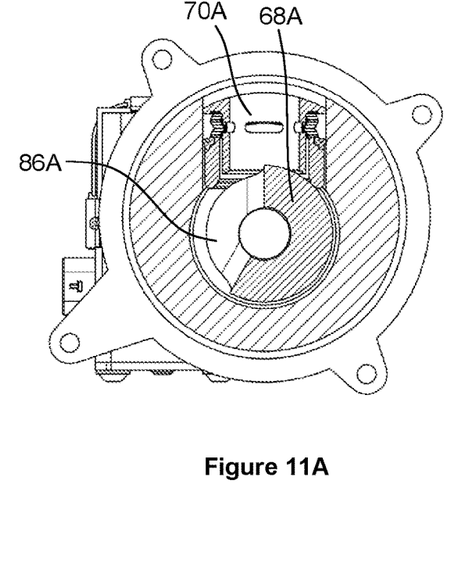
Figure 11B:
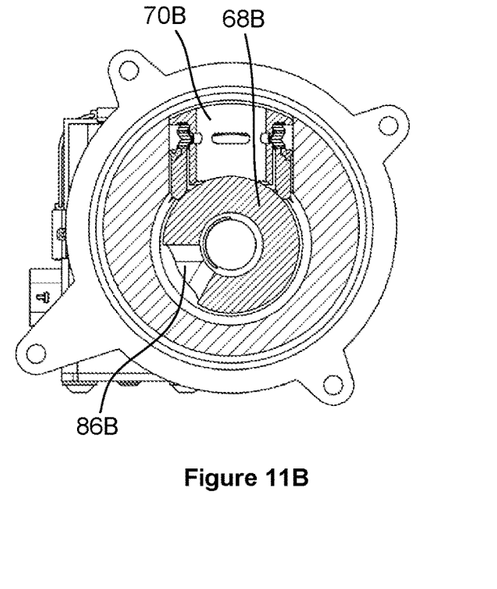
Figure 12A:
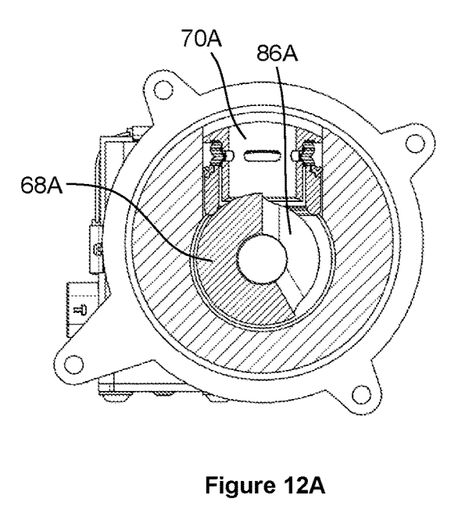
Figure 12B:
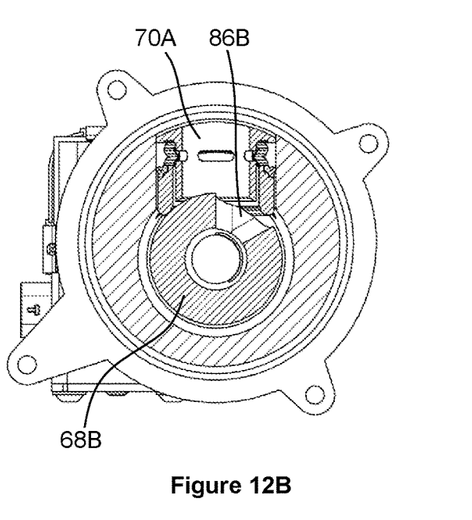

With particular reference to FIGS. 9A through 12B, four rotational positions of the rotary valve body 64, amongst many positions that are possible, are shown that result in different fluid flows from the first and second inlets 70A,70B to the outlet 72. Each pair of FIGS. 9A/9B, 10A/10B, 11A/11B, 12A/12B) captures orientations of the first and second fluid pathways 86A,86B of the first and second portions 68A,68B of the rotary valve body 64 for a given drive shaft 84 rotational position. FIGS. 9A and 9B show a first rotational position that allows full, unobstructed fluid flow from both the first and second inlets 70A,70B through the first and second fluid pathways 86A,86B to the outlet 72. FIGS. 10A and 10B show a second rotational position that prevents fluid flow from both the first and second inlets 70A,70B to the outlet 72, as no portion of the first and second fluid pathways 86A,86B is aligned with the respective first and second inlets 70A,70B. FIGS. 11A and 11B show a first intermediate rotational position that provides a throttled fluid flow from the first inlet 70A to the outlet 72, since a portion of the first fluid pathway 86A is aligned with the first inlet 70A, while preventing fluid flow from the second inlet 70B to the outlet 72, since no portion of the second fluid pathway 86B is aligned with the second inlet 70B. FIGS. 12A and 12B show a second intermediate rotational position that provides a throttled fluid flow from both the first and second inlets 70A,70B to the outlet 72, since only a portion of the first and second fluid pathways 86A,86B is aligned with their respective first and second inlets 70A,70B. One that is skilled in the art of EMRVs would understand that additional fluid flow combinations are possible such as a third intermediate rotational position that provides a throttled fluid flow from the second inlet 70B to the outlet 72, while preventing fluid flow from the first inlet 70A to the outlet 72.

The previously described modular EMRVs 10,60 provide a simplified, low-cost design that eliminates a traditional outer housing and the typical failure modes that often occur with plastic outer housings, such as cracking and leaking. The cumbersome packaging space associated with an EMRV is significantly reduced by eliminating all or most of the coolant hoses required for transport of engine coolant to various regions or parts of a powertrain system. The mating cavity 50A can be formed on or within a powertrain component or any other receiving structure by current state-of-the-art casting and machining methods. The unitized design of the modular EMRVs 10,60 facilitates improved serviceability and adaptability to a diverse array of fluid systems.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. An electro-mechanical rotary valve configured to be installed and removed as a unit, comprising:
    a valve enclosure arranged to be disposed within a mating cavity, the valve enclosure having:
        a central axis;
        at least one inlet;
        at least one outlet;
        a hollow center; and,
        at least one exterior seal interface;
    at least one rotary valve body, disposed within the hollow center, the at least one rotary valve body having:
        at least one fluid pathway;
        a central axis; and,
        an actuator interface; and,
    an actuator assembly engaged with the actuator interface, the actuator assembly having an actuator configured to be provided electronic communication from an electronic controller to move the at least one rotary valve body to a selected one of any angular position and stop at a selected one of any angular position within a continuous range of angular positions.

2. The electro-mechanical rotary valve of claim 1, wherein the at least one exterior seal interface is arranged at least partially circumferentially around the valve enclosure.

3. The electro-mechanical rotary valve of claim 1, wherein:
    the at least one inlet comprises a plurality of inlets; and,
    the at least one exterior seal interface sealingly isolates the plurality of inlets.

4. The electro-mechanical rotary valve of claim 1, wherein the central axis of the at least one rotary valve body is offset from the central axis of the valve enclosure.

5. The electro-mechanical rotary valve of claim 1, wherein the actuator assembly is further comprised of a gear train actuated by the actuator.

6. The electro-mechanical rotary valve of claim 5, wherein the actuator assembly is further comprised of a drive shaft, a first end of the drive shaft engaged with the gear train and a second end of the drive shaft engaged with the actuator interface.

7. The electro-mechanical rotary valve of claim 1, wherein the at least one inlet is radially arranged on the valve enclosure.

8. The electro-mechanical rotary valve of claim 7, wherein the actuator assembly is arranged at a first end of the valve enclosure and the at least one outlet is arranged at a second end of the valve enclosure.

9. The electro-mechanical rotary valve of claim 8, wherein:
    the at least one rotary valve body is comprised of one rotary valve body;

the at least one fluid pathway is comprised of one fluid pathway;

the at least one inlet is comprised of one inlet;

the at least one outlet is comprised of one outlet; and, the at least one exterior seal interface is comprised of:
- a first exterior seal interface arranged between the actuator assembly and the inlet; and,
- a second exterior seal interface arranged between the inlet and the second end of the valve enclosure.

10. The electro-mechanical rotary valve of claim 9, including:
- a first rotational position of the rotary valve body that allows full fluid flow from the inlet to the outlet;
- a second rotational position of the rotary valve body that prevents fluid flow from the inlet to the outlet; and,
- an intermediate rotational position that throttles fluid flow from the inlet to the outlet.

11. The electro-mechanical rotary valve of claim 8, wherein:

the at least one rotary valve body is comprised of one rotary valve body;

the at least one fluid pathway is comprised of a first fluid pathway arranged within a first portion of the rotary valve body and a second fluid pathway arranged within a second portion of the rotary valve body;

the at least one inlet is comprised of a first inlet and a second inlet;

the at least one outlet is comprised of one outlet;

the at least one exterior seal interface is comprised of:
- a first exterior seal interface arranged between the actuator assembly and the first inlet;
- a second exterior seal interface arranged between the first inlet and the second inlet; and,
- a third exterior seal interface arranged between the second inlet and the second end of the valve enclosure.

12. The electro-mechanical rotary valve of claim 11, including:
- a first rotational position of the rotary valve body that allows fluid flow from the first and second inlets to the outlet;
- a second rotational position of the rotary valve body that prevents fluid flow from the first and second inlets to the outlet; and,
- a first intermediate rotational position of the rotary valve body that allows fluid flow from one of the first or second inlet to the outlet, and prevents fluid flow from the other of the first or second inlet to the outlet.

13. The electro-mechanical rotary valve of claim 12, including:
- a second intermediate rotational position of the rotary valve body that throttles fluid flow from either the first inlet to the outlet or the second inlet to the outlet.

14. An electro-mechanical rotary valve configured to be installed and removed as a unit, comprising:
- a valve enclosure disposed within a mating cavity, the valve enclosure having:
  - a central axis;
  - at least one inlet;
  - at least one outlet;
  - a hollow center; and,
  - at least one exterior seal interface to sealingly engage with at least one interior seal interface within the mating cavity;
- at least one rotary valve body, disposed within the hollow center, the at least one rotary valve body having:
  - at least one fluid pathway; and,
  - an actuator interface; and,
- an actuator assembly engaged with the actuator interface, the actuator assembly having an actuator configured to be provided electronic communication from an electronic controller to move the at least one rotary valve body to a selected one of any angular position and stop at a selected one of any angular position within a continuous range of angular positions.

15. The electro-mechanical rotary valve of claim 14, further comprising at least one seal arranged between the at least one exterior seal interface and the at least one interior seal interface.

16. The electro-mechanical rotary valve of claim 14, wherein the mating cavity is configured within a powertrain component.

17. The electro-mechanical rotary valve of claim 14, wherein the mating cavity is a fluid terminal for at least two intersecting fluid flow paths.

18. The electro-mechanical rotary valve of claim 14, wherein the mating cavity extends inwardly from an outer wall of a receiving structure.

19. The electro-mechanical rotary valve of claim 14, wherein the mating cavity protrudes outwardly from an outer wall of a receiving structure.

20. The electro-mechanical rotary valve of claim 14, wherein the mating cavity and the valve enclosure are cylindrical.

* * * * *